United States Patent [19]

Hagenah

[11] Patent Number: 4,667,578
[45] Date of Patent: May 26, 1987

[54] AIR-EXTRACTOR CASING FOR MOTOR VEHICLES

[75] Inventor: Frank Hagenah, Pulheim-Stommein, Fed. Rep. of Germany

[73] Assignee: Ford Motor Company, Dearborn, Mich.

[21] Appl. No.: 828,111

[22] Filed: Feb. 10, 1986

[51] Int. Cl.⁴ .............................................. B60H 1/24
[52] U.S. Cl. ..................................................... 98/2.18
[58] Field of Search ........................... 98/2, 2.18, 119

[56] References Cited

U.S. PATENT DOCUMENTS 3,059,562 10/1962 Sturtevant et al. .............. 98/2.18 X
3,391,628 7/1968 Ziegenfelder ........................ 98/2.18

FOREIGN PATENT DOCUMENTS 2603297 5/1984 Fed. Rep. of Germany .
61013 4/1983 Japan .................................... 98/2.18
11909 1/1984 Japan .................................... 98/2.18
63221 4/1984 Japan .................................... 98/2.18
1509177 4/1978 United Kingdom ................. 98/2.18

Primary Examiner—Harold Joyce
Attorney, Agent, or Firm—Daniel M. Stock; Clifford L. Sadler

[57] ABSTRACT

An air-extractor casing for motor vehicles is concealed behind a bumper component at the side of the vehicle. The casing comprises a main body of resilient material which can be clipped into an opening in the vehicle body behind the bumper and which has a deflector cap integrally formed in one piece and a non-return flap. Formed integrally with the main body is an air guide fin which surrounds the front and lower part of the region adjacent to the air-extractor opening and which has resilient lip edges which bear closely and in a sealing manner against the inner surfaces of the bumper component lying in front of them.

2 Claims, 2 Drawing Figures

AIR-EXTRACTOR CASING FOR MOTOR VEHICLES

BACKGROUND OF THE INVENTION

The invention relates to an air-extractor casing for motor vehicles, which is arranged concealed behind bumper components on the side of the vehicle and comprises a main body of resilient material which can be clipped into an opening in the vehicle bodywork and in which a non-return flap is provided.

DESCRIPTION OF THE PRIOR ART

A passenger compartment air extractor for passenger cars is known from the German Patent No. 26 03 297, in which an air-extractor opening is arranged concealed behind side-facing bumper components and is protected from water sprayed from above by a deflector cap or scoop.

A similar passenger compartment air extractor is known from use on the Audi 100 motor car model, in which the air-extractor opening is covered by an air-extractor casing of resilient material with a deflector cap integrally formed thereon.

This known arrangement of an air-extractor opening or of an air-extractor casing which covers this air-extractor opening has the disadvantage that the direct air-extractor opening and in particular the delicate diaphragm flap cannot easily be protected against sprayed water and the ingress of dirt from below, and this can lead to difficulties particularly where the motor vehicle has a short tail overhang and the position of the air-extractor opening is in the immediate vicinity of the rear wheels.

SUMMARY OF THE INVENTION

The object of the invention is to improve an air-extractor casing of the known type in such a way as to achieve protection against sprayed or dirty water splashed up by the driving wheels on the one hand and to achieve a desired and more advantageous change in the pressure drop in the region of the air-extractor opening on the other.

According to the invention there is provided an air-extractor casing for motor vehicles adapted to be concealed behind bumper components and comprising a main body of resilient material which has an air extractor opening and which can be clipped into an opening in the vehicle body a non-return flap for closing the opening, and an air guide fin formed integrally with the main body and surrounding the front and lower part of the region adjacent to the air-extractor opening, the fin having resilient lip edges which are adapted to bear closely and in a sealing manner against inner surfaces of a bumper component lying in front of the opening.

By virtue of the fact that an air guide fin is formed integrally with the main body, and has resilient lip edges which surround the front and lower part of the region adjacent to the air-extractor opening which bear closely and in a sealing manner against the inner surfaces of the bumper component lying in front of them, on the one hand a reliable protection against sprayed water or dirt splashed up by the driving wheels is achieved and on the other hand the pressure conditions in the region of the air-extractor opening are expediently changed in that a constant underpressure in this region is achieved.

BRIEF DESCRIPTION OF THE DRAWINGS

The invention is described in greater detail with reference to one embodiment illustrated in the accompanying drawings in which.

DESCRIPTION OF THE PREFERRED EMBODIMENT

Figure 1:
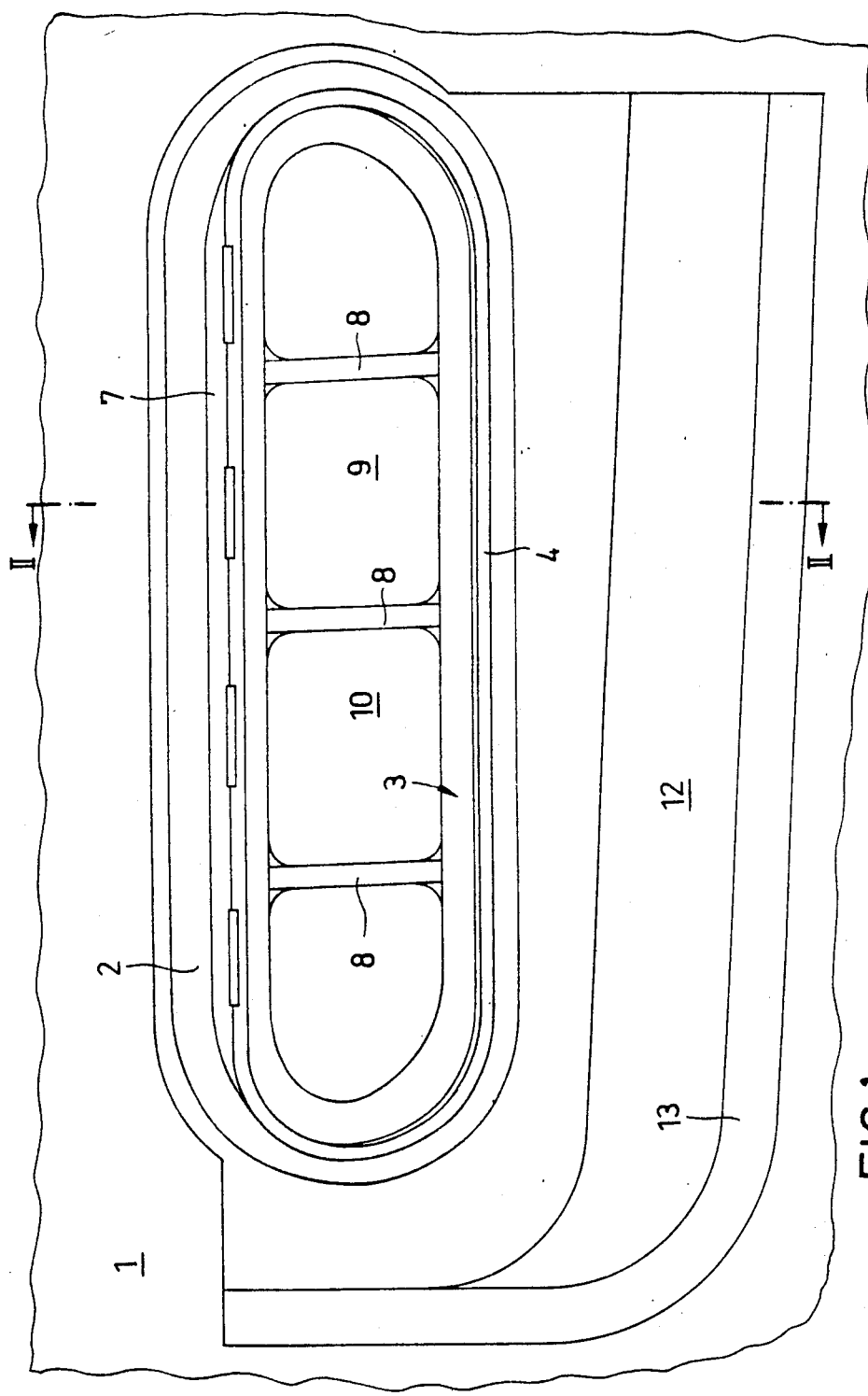
FIG. 1 is a lateral view of an air extractor casing according to the invention with the bumper removed.

In FIG. 1 an air-extractor opening 2 which has a continuous flanged edge and in which an air-extractor casing 3 of resilient material is clipped in known manner is formed in the vehicle fender 1. The air-extractor casing 3 of resilient material essentially comprises a main body 4, from which a continuous bead edge 5 with engaging edges 6 extends towards the rear and from which an integrally formed deflector cap 7 extends forwardly. The main body 4 has an air-extraction opening 9 which is subdivided by webs 8 and over which engages a non-return flap 10.

The flap 10 is kept so thin and flexible in known manner that it opens when there is an internal pressure in the passenger compartment and an external underpressure on the outside, and it closes when the pressure conditions are reversed, so as to prevent dust or exhaust gases from penetrating into the passenger compartment.

Figure 2:
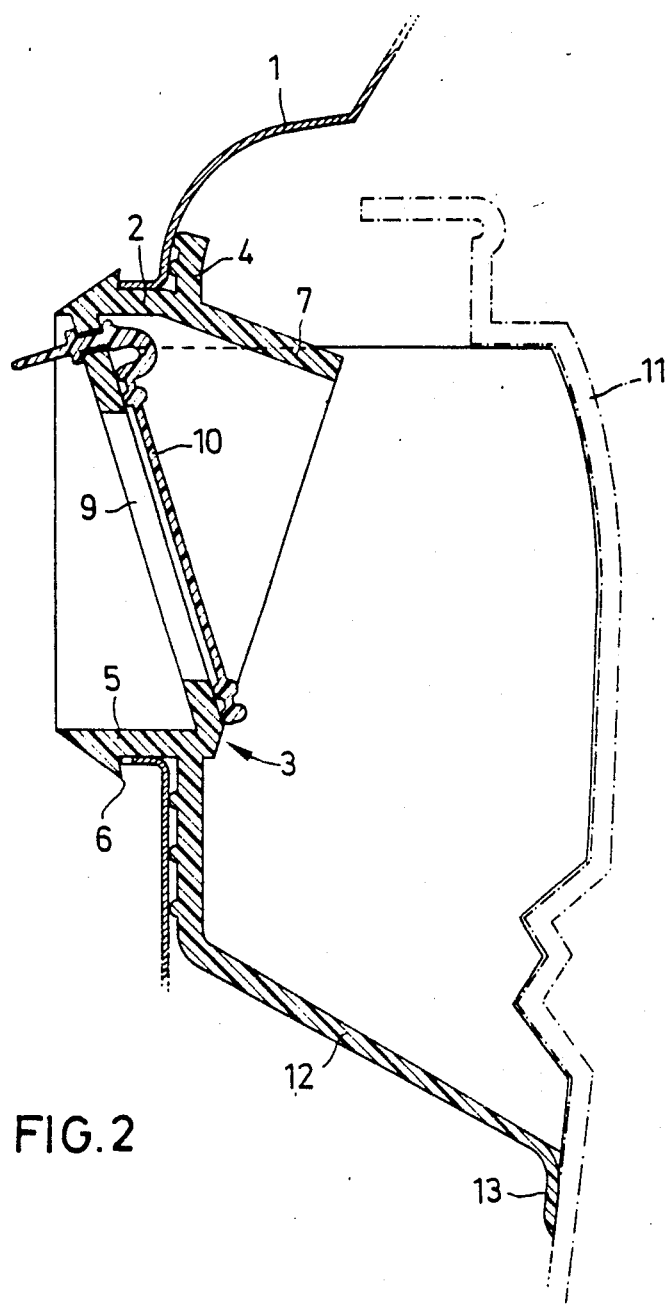
FIG. 2 is a vertical section along the line II—II in FIG. 1 with the bumper indicated in dash-dot lines.

As may be seen from FIG. 2, the arrangement of the air-extractor casing 3 is designed in such a way that it is covered by bumper components 11 at the side of the vehicle which are shown in dash-dot lines.

In the case of motor vehicles with a short rear body overhang, it has been found that sprayed and contaminated water thrown up by the driving wheels penetrates into the region of the air-extractor casing 3 and adversely affects the operation of the non-return flap 10 on account of the accumulation of dirt. In addition, in the case of disadvantageous flow conditions, the desired underpressure in the region of the air-extractor casing 3 has not been sufficiently constant and of sufficient magnitude.

However, if the front and lower part of the region adjacent to the air-extractor opening 2 is surrounded by an air guide fin 12 which is formed integrally in one piece with the main body 4 of the air-extractor casing 3, as shown in FIG. 2, and the resiliently held lip edges 13 of the fin bear closely against the inner surface of the bumper 11 lying in front of them, then the opening 2 is protected from thrown-up spray or dirt and furthermore satisfactory pressure conditions are achieved in the region of the opening.

What is claimed is:

1. An air-extractor casing for motor vehicles adapted to be concealed behind bumper components and comprising a main body of resilient material which has an air-extractor opening opening outwardly with respect to the vehicle and which can be clipped into an opening in the vehicle body, a non-return flap for closing the opening, and an air guide fin formed integrally with the main body and surrounding only the outer and lower part of the region adjacent to the air-extractor opening, the fin having resilient lip edges which are adapted to bear closely and in a sealing manner against inner surfaces of a bumper component lying over and outwardly spaced from the opening.

2. An air-extractor casing as defined in claim 1 wherein the main body further comprises a cap portion extending downwardly from the upper part of the region adjacent the opening and toward the bumper.

* * * * *